(No Model.)
E. J. AVERILL.
COMBINED SPOON AND SCRAPER.
No. 339,514. Patented Apr. 6, 1886.
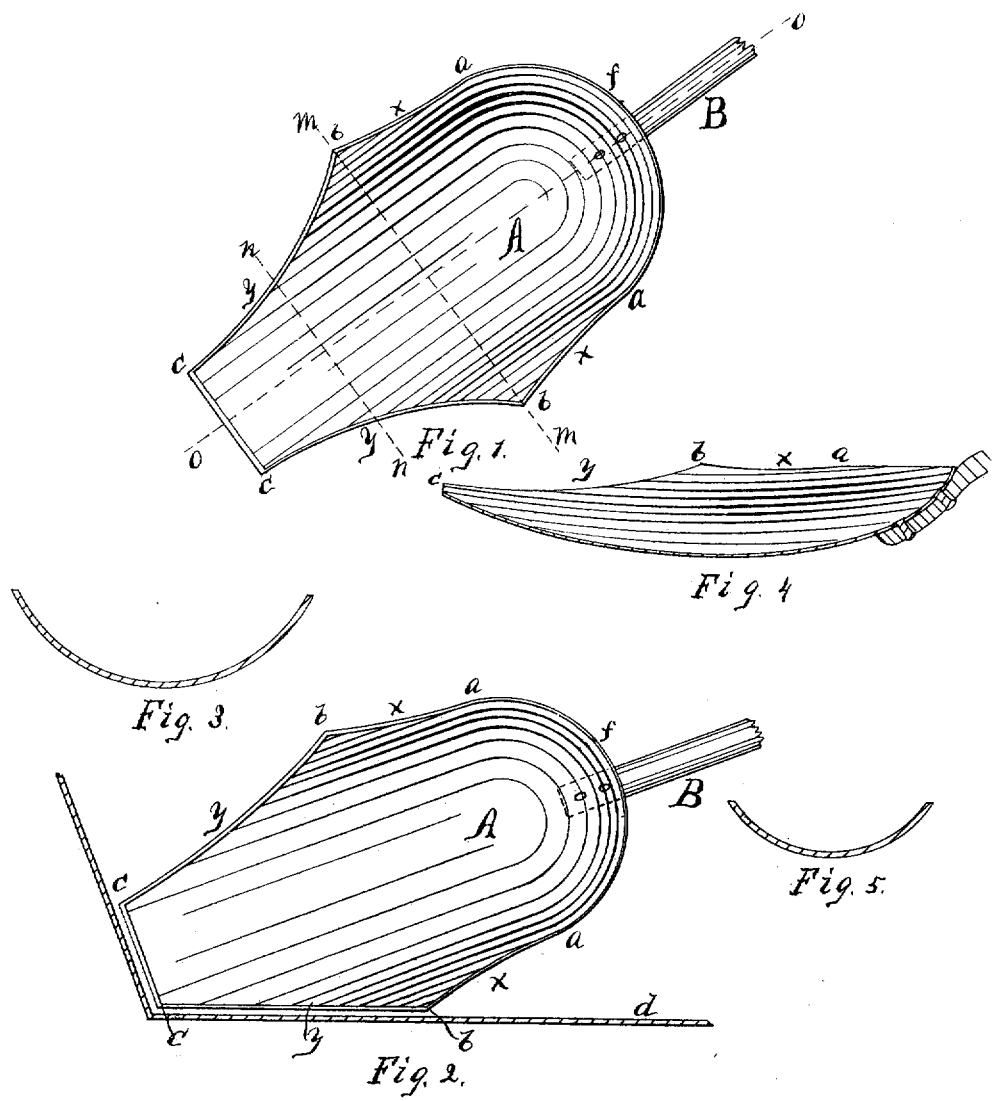

(No Model.)  2 Sheets—Sheet 2.

E. J. AVERILL.
COMBINED SPOON AND SCRAPER.

No. 339,514. Patented Apr. 6, 1886.

Witnesses.
Geo. G. Barker
W. H. Harlow

Inventor
Emery J. Averill
By J. R. Mason atty

UNITED STATES PATENT OFFICE.

EMERY J. AVERILL, OF BANGOR, MAINE.

COMBINED SPOON AND SCRAPER.

SPECIFICATION forming part of Letters Patent No. 339,514, dated April 6, 1886.

Application filed November 7, 1885. Serial No. 182,107. (No model.)

*To all whom it may concern:*

Be it known that I, EMERY J. AVERILL, a citizen of the United States, residing at Bangor, in the county of Penobscot and State of Maine, have invented a new and useful Combined Spoon and Scraper; and I do hereby declare that the following is a full, clear, and exact description of the invention, which will enable others skilled in the art to which it appertains to make and use the same.

My invention consists of a combined spoon and scraper, being substantially an improvement upon the common spoons or ladles, and is chiefly applicable to the forms of these utensils used for cooking purposes. It is illustrated in the accompanying drawings, in which—

Figure 6:
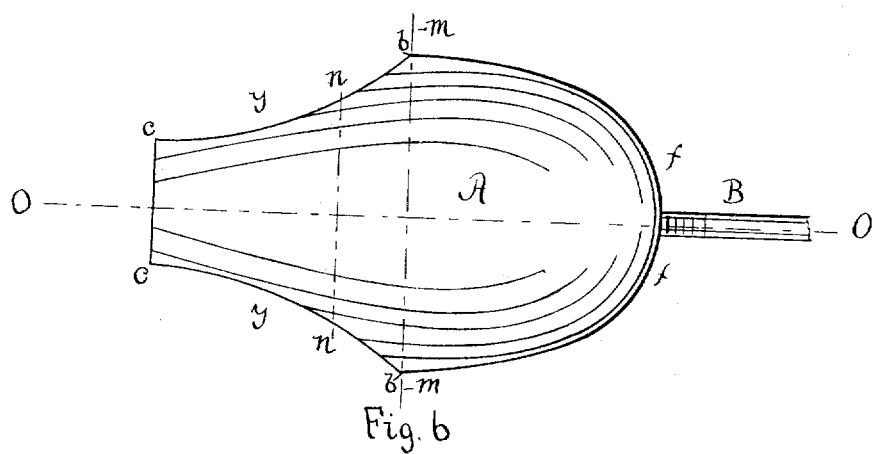
Figure 7:
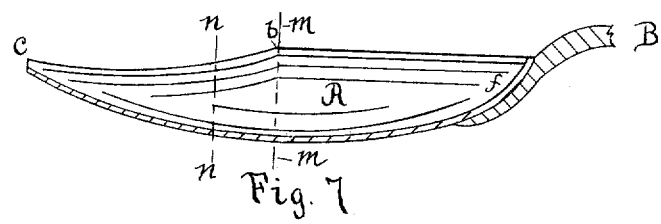

Figure 1 is a front view of my spoon and scraper. Fig. 2 is a front view of the same in position for scraping the bottom and side of a pan or kettle. Fig. 3 is a cross-section of the same on the line $m\ m$. Fig. 4 is a longitudinal sectional view of the same on the line $o\ o$. Fig. 5 is a cross-section on the line $n\ n$. Fig. 6 is a front view of a modified form of my spoon and scraper. Fig. 7 is a longitudinal sectional view of said modified form on the line $o\ o$.

Similar letters refer to corresponding parts throughout the figures.

The configuration of the common spoon is designed, chiefly, to facilitate the dipping of small quantities of liquids, and incidentally for stirring them. Dipping being its chief function the elliptical outline of the lips of the bowl is so contrived throughout its whole extent as to preserve the same altitude above the bottom of the bowl and to be in the same plane; but this regular elliptical outline renders the spoon inapplicable to some common uses, and it is to remedy this defect that I have invented my improvement.

In stirring thick liquids and mushy substances in the common forms of cooking-vessels the convexed point of the common spoon can operate only upon an insignificant space, scarcely more than a point, in fact, upon the bottom of the vessel, while it is frequently necessary or desirable that such substance be scraped clean from the flat or curved bottom. The same difficulty also occurs when the convexed sides of the spoon are drawn across the various shaped walls or sides of the cooking-vessels. These walls or sides of pots, pans, and kettles are sometimes perpendicular and cylindrical and sometimes of the shape of an inverted cone, with or without an outward curve at the top.

My object is to provide a utensil which while answering substantially all the purposes served by the common spoon—such as dipping and stirring—may also serve as a scraper, to clean the inner surfaces of almost any shape of hollow ware and prevent the contents from adhering to the bottom or sides thereof.

I form my spoon and scraper with a bowl, A, and shank or handle B, substantially like the common spoon. The only changes I make are in the configuration or outline of the lips of the bowl. The outline of the butt-end $f$ of the bowl I form like the common spoon up to about the points $a\ a$, where the curve of the lips suddenly diminishes. From the points $a\ a$, in prolonging the outline of the lips or sides of the spoon, I abandon the plane used in forming the lips as far as $a\ a$, and slightly concave the outline of the lips until the greatest width of the bowl is reached at $b\ b$, forming the concavities $x\ x$. From the points $b\ b$ to the extremities $c\ c$ of the point of the spoon I concave the outlines of the sides much more sharply than from $a\ a$ to $b\ b$, forming the concavities $y\ y$, which are carried to the extremities $c\ c$ of the tip or point of the bowl. I form the tip by cutting the bowl off square, leaving the tip of any convenient width, and in practice I find that a width of about three-quarters of an inch gives favorable results. The curve of the concavities $y\ y$ is such that, when the spoon is rested upon one of its side edges upon a horizontal surface and canted backward until it forms an angle of from sixty-five to seventy-five degrees with the horizontal plane, every point of the concavity $y$ upon that edge will bear upon the flat surface, and the whole of that concavity will describe an arc of a true circle. If the spoon then be tilted farther backward, the extremities $b$ and $c$ of the concavities $y$ gradually rise, leaving more or less of the middle of the concavity bearing upon the flat surface, according to the amount of the tilt. If the spoon be tilted forward the middle of the concavity $y$ rises from the surface on which the spoon bears, and only the extremities $b$ and $c$ of the concavity $y$ remain in contact with the flat surface.

It follows from the foregoing that the spoon being held with one side upward and tilted at about the angle before stated, the flat bottom of a cooking-vessel may be scraped clean by the concavity undermost at the time, every point of which will bear upon the flat bottom, while the point $c\ c$ of the spoon being a straight line or edge will fit into and fill the angle formed by the bottom and side walls of the vessel, and bear upon the side wall, thus affording a means of scraping portions of the bottom and sides of the vessel and the corners formed by their junction simultaneously.

It is apparent that when the spoon is held perpendicularly and point downward the bottom of the vessel may be scraped by the wide flat point.

Another most useful purpose served by the concavities $y\ y$ is that by varying the cant at which the spoon is held, according to the magnitude of the curve of the cylindrical or conical vessel operated upon, the concavities $y\ y$ may be made to bear upon every portion of both the interior and exterior surfaces of hollow cylindrical or conical bodies, and even upon hollow inverted conical bodies with outwardly-curved rims, and all this, whether the spoon be held in a nearly perpendicular or horizontal position.

The concavities $x\ x$ near the butt-end of the bowl are of considerably less curve than the concavities $y\ y$, and are designed as scrapers for flat surfaces, not in hollow ware—such as bread-boards—the curve of these concavities being determined by the amount of cant most conveniently given the spoon when applied to this use.

The spoon and scraper, if desired, may be formed, as shown in Figs. 6 and 7, without the concavities $x\ x$, as the concavities $y\ y$ will perform the same function; but the latter are more especially designed for the bottoms and sides of kettles, and I prefer to form my device with both sets of concavities $x\ x$ and $y\ y$.

The edges of the concavities may, if desired, be beveled off inwardly to facilitate the operation of scraping.

Having thus described my invention, what I claim, and desire to secure by Letters Patent, is—

1. A spoon-bowl formed with a truncated point and having its side edges concaved from the extremities of the point to points at or near the line of greatest width of the bowl, substantially as described.

2. A spoon-bowl formed with a truncated point and having its side edges concaved from the extremities of the point to points at or near the line of greatest width of the bowl, and thence again concaved toward the butt-end of the bowl, substantially as described.

3. The combination, with a shank or handle, of a spoon-bowl formed with a truncated point and having its side edges concaved from the extremities of the point to points at or near the line of greatest width of the bowl, substantially as described.

EMERY J. AVERILL.

Witnesses:
HARRY D. STEWART,
F. H. CLERGUE.